United States Patent
Cuzacq et al.

(10) Patent No.: US 9,621,608 B2
(45) Date of Patent: *Apr. 11, 2017

(54) DIGITAL CONTENT SUPPLY SYSTEM

(71) Applicant: Accenture Global Services Limited, Dublin (IE)

(72) Inventors: Olivier Cuzacq, Paris (FR); Pierre Munier, Woodford Green (GB)

(73) Assignee: Accenture Global Services Limited, Dublin (IE)

( * ) Notice: Subject to any disclaimer, the term of this patent is extended or adjusted under 35 U.S.C. 154(b) by 38 days.

This patent is subject to a terminal disclaimer.

(21) Appl. No.: 14/797,928

(22) Filed: Jul. 13, 2015

(65) Prior Publication Data

US 2015/0319208 A1 Nov. 5, 2015

Related U.S. Application Data

(63) Continuation of application No. 12/763,347, filed on Apr. 20, 2010, now Pat. No. 9,081,775.

(30) Foreign Application Priority Data

Apr. 8, 2010 (EP) ..................................... 10305362

(51) Int. Cl.
*G06F 17/30* (2006.01)
*H04L 29/06* (2006.01)
(Continued)

(52) U.S. Cl.
CPC ........ *H04L 65/60* (2013.01); *G06F 17/30017* (2013.01); *G06F 17/30076* (2013.01);
(Continued)

(58) Field of Classification Search
CPC ........... G06F 17/30905; G06F 11/0706; G06F 11/0793; G06F 17/2229; G06F 17/30017; G06F 17/30569; G06F 17/30867
See application file for complete search history.

(56) References Cited

U.S. PATENT DOCUMENTS 5,974,409 A 10/1999 Sanu et al.
5,991,306 A 11/1999 Burns et al.
(Continued)

FOREIGN PATENT DOCUMENTS

WO WO 01/99411 A1 12/2001
WO WO 2008/082441 7/2008
WO WO 2009/019558 A2 2/2009

OTHER PUBLICATIONS

European Search Report corresponding to EP 10 305 363.3 mailed Jul. 23, 2010, 7 pages.
(Continued)

*Primary Examiner* — Angelica Ruiz
(74) *Attorney, Agent, or Firm* — Harrity & Harrity, LLP

(57) ABSTRACT

The invention concerns a method of generating and electronically transmitting to at least one distribution platform a digital media product, the method involving: generating product parts of a first product based on a plurality of digital media files retrieved from a database (112), and storing the product parts in a product memory (140); transmitting the first product comprising the product parts to a first distribution platform; and determining, based on scheduling data, whether, after transmission to the first distribution platform one or more of the product parts is scheduled to be transmitted to another distribution platform, and if not, deleting the one or more product parts from the product memory.

20 Claims, 3 Drawing Sheets

(51) Int. Cl.
  *H04L 29/08* (2006.01)
  *H04N 21/231* (2011.01)
(52) U.S. Cl.
  CPC ............ *H04L 65/602* (2013.01); *H04L 67/10* (2013.01); *H04N 21/23113* (2013.01)

(56) References Cited

U.S. PATENT DOCUMENTS

| | | | |
|---|---|---|---|
| 6,515,968 | B1 | 2/2003 | Combar et al. |
| 6,763,377 | B1 | 7/2004 | Belknap et al. |
| 7,689,672 | B2 | 3/2010 | Kanojia et al. |
| 7,702,781 | B2* | 4/2010 | Devolites ............ G06Q 30/0601 709/224 |
| 7,761,591 | B2 | 7/2010 | Graham |
| 8,359,349 | B2 | 1/2013 | Aaltonen et al. |
| 9,081,775 | B2 | 7/2015 | Cuzacq et al. |
| 2002/0106086 | A1 | 8/2002 | Kamiya et al. |
| 2002/0143565 | A1 | 10/2002 | Headings et al. |
| 2004/0073925 | A1 | 4/2004 | Kinoshita |
| 2006/0294546 | A1 | 12/2006 | Ro et al. |
| 2007/0088731 | A1 | 4/2007 | Chant |
| 2007/0219949 | A1 | 9/2007 | Mekikian |
| 2009/0037950 | A1 | 2/2009 | Ching et al. |
| 2009/0138925 | A1 | 5/2009 | Headings |
| 2009/0276605 | A1* | 11/2009 | Arndt ................... G06F 12/0646 711/209 |
| 2009/0287841 | A1 | 11/2009 | Chapweske et al. |
| 2010/0208634 | A1 | 8/2010 | Eng et al. |
| 2011/0252056 | A1 | 10/2011 | Cuzacq et al. |

OTHER PUBLICATIONS

European Search Report corresponding to EP 10 305 362.5 mailed Jul. 8, 2010, 6 pages.
Pavlovski, C. J., "Service Delivery Platforms in Practice", IP Multimedia Systems (IMS) Infrastructure and Services, IEEE Communications Magazine, IEEE Service Center, Piscataway, US, vol. 44, No. 3, Mar. 1, 2007, pp. 114-121.

* cited by examiner

DIGITAL CONTENT SUPPLY SYSTEM

RELATED APPLICATIONS

This application is a continuation of U.S. patent application Ser. No. 12/763,347, filed Apr. 20, 2010 (now U.S. Pat. No. 9,081,775), which claims priority to European Patent Application No. 10305362.5, filed Apr. 8, 2010, the disclosures of which are incorporated by reference herein in their entirety.

FIELD OF THE INVENTION

The present invention relates to a method and system for managing a database of digital media files, and in particular to a method and system for generating and transmitting digital media products to one or more distribution platforms.

BACKGROUND TO THE INVENTION

The producers of digital media content, such as music albums or films, generally wish to have their products made available quickly and efficiently in multiple countries, or even worldwide.

In recent years, a number of online distribution platforms have emerged meeting the need of supplying and/or selling media content products to online users, via the internet. For example, companies such as iTunes, Amazon and Spotify (the names "iTunes", "Amazon" and "Spotify" are likely to be registered trademarks), to name but a few, provide websites allowing users the possibility of temporarily accessing media content over the internet, for example by having the content "streamed" to their access post, and/or the possibility of purchasing the right to download media content products via the internet, and store them for unlimited playback.

As with any distribution system, it is necessary that the products, in this case the digital media files, generated by the producer, are packaged and transmitted to the consumer outlets, in this case the distribution platforms. It has been proposed to at least partially automate this packaging and transmission process.

However, there are technical challenges in implementing such a system. For example, digital media products are generally sold to the end user in a format different to the format provided by the producer, and therefore format conversion is often required. This conversion requires relatively high processing resources. Furthermore, such systems must be capable of handling extremely high quantities of data. This situation is not helped by the increasing sizes of music, image and video files in recent years, due to a move towards higher sampling rates for sound, and higher definition for images and video. The storage and management of such large quantities of data is very demanding on system resources, particularly where thousands or even millions of media products are involved.

There is thus a need for a method and system for packaging and transmitting digital media content to distribution platforms.

SUMMARY OF THE INVENTION

It is an aim of the present invention to at least partially address one or more needs in the prior art.

According to one aspect of the invention, there is provided a method of generating and electronically transmitting to at least one distribution platform a digital media product, the method comprising: identifying, based on scheduling data, a plurality of digital media files to form a first digital media product to be transmitted to a first distribution platform; generating product parts of said first product based on said plurality of digital media files retrieved from a database, and storing said product parts in a product memory; transmitting said first product comprising said product parts to said first distribution platform; and determining, based on said scheduling data, whether after transmission to said first distribution platform one or more of said product parts is scheduled to be transmitted to another distribution platform (116, 118, 120), and if not, deleting said one or more product parts from said product memory.

According to another embodiment, if it is determined from said scheduling data that a first of said product parts is scheduled to be transmitted to a second distribution platform: determining the time interval until a scheduled transmission time of said first product part to the said second distribution platform; comparing said time interval with a threshold value; and based on said comparison, deleting or not said first product part from said product memory.

According to another embodiment, the method further comprises, prior to generating said product parts, verifying that one or more of said product parts are not already stored in said product memory.

According to another embodiment, said plurality of digital media files are in a first file format, and generating said product parts comprises converting the format of at least one of said plurality of digital media files to a second file format.

According to another embodiment, said database stores master copies of digital media files in said first file format, said first file format being a loss-less file format.

According to another embodiment, said first product further comprises metadata identifying at least a title of said first digital media product.

According to another aspect of the invention, there is provided a method of generating and transmitting to at least one distribution platform a digital media product, the method comprising: generating product parts of said first product by retrieving, from a media database, first and second digital media files, processing said first and second digital media files to form first and second parts respectively of said first product, and storing said first and second product parts in a product memory; and transmitting said first product by transmitting said first and second product parts to at least one distribution platform.

According to another embodiment, the method further comprises: identifying a plurality of digital media files including said first digital media file to form a second digital media product; and transmitting said second product including transmitting said first product part stored in said product memory to at least one distribution platform.

According to another aspect of the invention, there is provided a system for generating and electronically transmitting to at least one distribution platform a digital media product, the system comprising: a storage device adapted to store a database of digital media files; a product memory adapted to store product parts of digital media products; an asset management module adapted to identify, based on scheduling data, a plurality of digital media files of a first digital media product to be transmitted to a first distribution platform; a provisioning module adapted to generate product parts of said first product based on said plurality of digital media files retrieved from said database, and to store said product parts in said product memory; and a distribution module adapted to transmit said first product comprising said product parts to said first distribution platform, and to determine, based on said scheduling data, whether after transmission to said first distribution platform one or more of said product parts is scheduled to be transmitted to another distribution platform, and if not, to delete each of said one or more product parts from said product memory.

According to another embodiment, if it is determined from said scheduling data that a first of said product parts is scheduled to be transmitted to a second distribution platform, said distribution module is further adapted to determine the time interval until a scheduled transmission time of the first product part to the said second distribution platform; to compare said time interval with a threshold value; and based on said comparison, to maintain in said product memory or to delete from said product memory the first product part.

According to another embodiment, the system further comprises a packaging unit adapted to package said product parts with electronic metadata identifying at least a title of said first digital media product.

According to another embodiment, the system further comprises a plurality of distribution platforms adapted to supply said first digital media product data to at least one user via the internet.

According to another aspect of the invention, there is provided a system for generating and transmitting to at least one distribution platform a digital media product, the system comprising: a storage device adapted to store a database of digital media files; a provisioning module arranged to generate product parts of said first digital media product by retrieving from said database first and second digital media files, processing said first and second digital media files to generate first and second product parts respectively, and storing said first and second product parts in a product memory; and a distribution module arranged to transmit said first product by transmitting said first and second product parts to at least one distribution platform.

According to another embodiment, the system further comprises an asset management module adapted to identify said first and second digital media files forming said first digital media product.

According to another embodiment, said asset management module is further adapted to identify a plurality of digital media files including said first digital media file to form a second digital media product, and wherein said distribution module is arranged to transmit said second product data by transmitting said first product part to at least one distribution platform.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF EMBODIMENTS OF THE PRESENT INVENTION

Figure 1A:
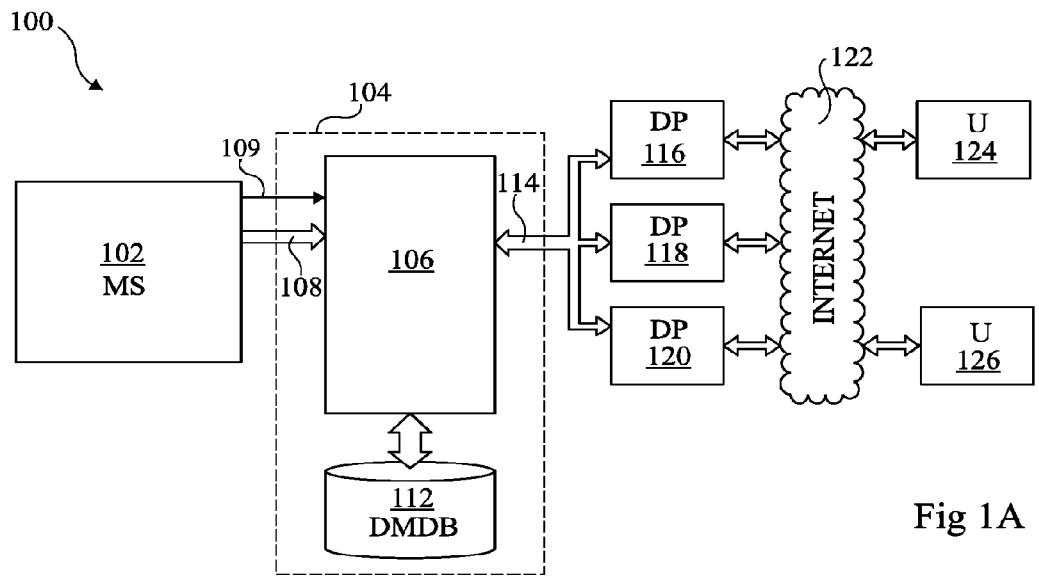
FIG. 1A schematically illustrates a digital content distribution network according to an embodiment of the present invention.

FIG. 1A illustrates schematically a digital content distribution network 100.

Distribution network 100 comprises a media supply (MS) platform 102, which for example corresponds to hardware of a digital content producer. As explained in the background section above, the digital content producer is for example a record label or film company which produces digital media files.

Digital media files are sent from the media supply platform 102 to a distribution system 104. The digital media files are for example "master" versions of the media content that may be copied multiple times during distribution. They are for example in a loss-less format. For example, music tracks have the WAV (waveform audio) file format, FLAG (free loss-less audio codec) file format or ATRAC (advanced loss-less) file format. Image files for example have the JPEG LS (JPEG loss-less) file format. Video or movie files are for example in a high definition (HD) format. Compressed file formats could also be used, for example for media files containing ringtones, images, or video destined for mobile telephones.

Distribution system 104 comprises a processing unit 106, which receives the digital media files from the media supply platform 102 via a data connection 108. Elements of metadata can also be sent from the media supply platform 102 to processing unit 106 via a data connection 109. As will be described in more detail below, the metadata corresponds to data identifying products, and for example comprises information indicating one or more of the digital media files that are to form the product, as well as country specific information such as the artists or actors, tracks or video titles, the product title for a given country, the product release date in a given country, allowed usages and pricing information for a given country.

The processing unit 106 has access to a digital media database (DMDB) 112, which stores the digital media files and the metadata received from the media supply platform 102.

The processing unit 106 communicates via a data connection 114 to a number of distribution platforms (DP) 116, 118 and 120. The distribution platforms 116 to 120 for example correspond to servers provided by companies specialized in the electronic supply to consumers of digital media content, for example via the internet. As mentioned above in the background section, examples of just a few such companies include iTunes, Amazon and Spotify.

As illustrated in FIG. 1, user access posts, two examples of which are shown labeled 124 and 126, may connect to one or more of the distribution platforms 116, 118, 120 via the Internet 122, and in this way the users may access and/or purchase digital media products. For example, the user access posts 124, 126 correspond to home/office PCs (personal computers), laptops, netbooks, PDAs (personal digital assistants), mobile phones or other internet access devices. These devices may connect to the internet via a range of mediums, such as wireless telecommunications networks, cable or ASDL (asymmetric digital subscriber line) connections, LANs (local area networks), and/or Wireless LANs.

A number of different user distribution channels may be provided, allowing different usages, depending on the commercial model for a given product. For example in some cases, the digital media products may be available via "streaming", meaning they are transmitted "on the fly" during playback of the product on the user access post, but are never entirely and permanently downloaded to the user access post.

Alternatively, a user may purchase a license to download and store items of media content, which may then be accessed and played back as often as the user wishes.

The commercial model for a given product may specify to whom and how the product is available. For example, products may be available free of charge via streaming, and to subscribers who pay a monthly subscription fee via download.

The data connections 108, 109 and 114 between system 104 and the platforms 102 and 116 to 120 may be secure connections provided over the internet, or connections established via other means.

Figure 1B:
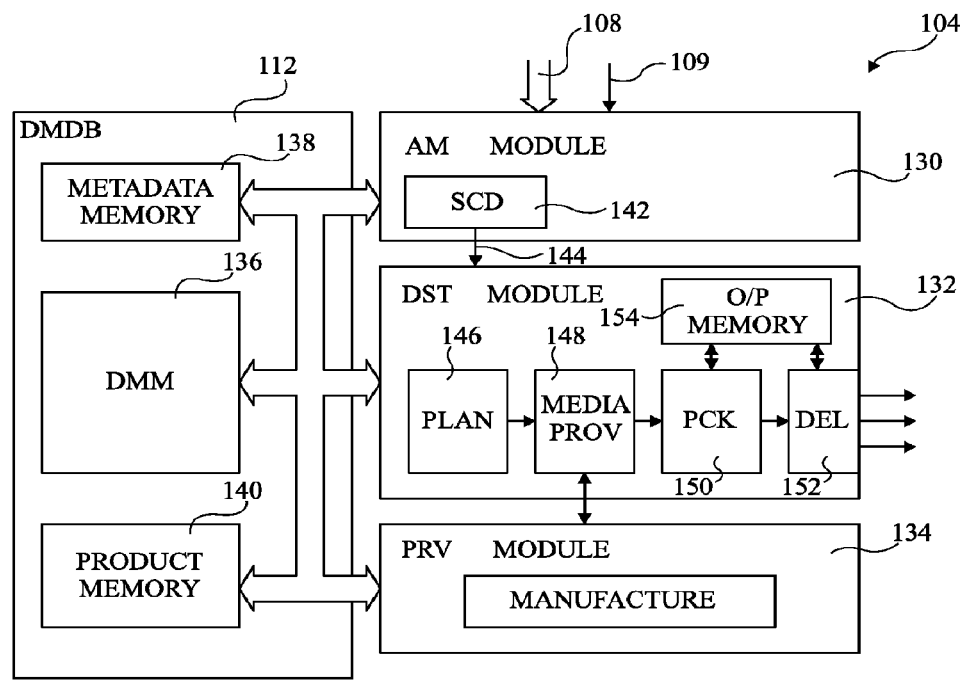
FIG. 1B schematically illustrates a distribution system of FIG. 1A in more detail according to an embodiment of the present invention.

FIG. 1B illustrates the distribution system 104 of FIG. 1A in more detail.

The processing unit 106 comprises an asset management (AM) module 130, which manages the media content stored by the system, a distribution (DST) module 132, which controls the generation, and delivery of digital media products, and a provisioning module 134, which builds digital media products. The digital media database (DMDB) 112 comprises a digital media memory (DMM) 136, which stores the master copies of digital media files, a metadata memory 138, which stores metadata corresponding to digital media products, and a product memory 140, which stores product parts forming digital media products.

The AM module 130 for example receives new digital media files on the data input 108 and associated metadata on the data input 109, originating from the media supply platform 102. The AM module 130 for example has access to the digital media memory 112, allowing the digital media files to be stored in the database 112, and deleted when they are no longer to be managed by the system. The AM module 130 also has access to the metadata memory 138, allowing metadata to be added and modified.

A scheduling file 142 is for example maintained by the AM module 130, and comprises scheduling data indicating all future orders relating to digital media products to be generated and transmitted by the system. For example, the scheduling information is in the form of a distribution instruction for each digital media product and each distribution platform. This data is for example automatically extracted from metadata received from the media supply platform 102, and/or entered by an operator of the system 104. This file will be described in more detail below.

The AM module 130 comprises an output 144 to the distribution module 132, for controlling the various steps in the product distribution process, as will now be explained.

The distribution module 132 comprises a planning module 146, which for example determines an order in which distribution instructions are to be processed, a media provisioning module 148, which determines if and when digital media products are to be generated in time for transmission, a packaging module 150, which prepares digital media products for transmission, and a delivery module 152, which controls the transmission of the digital media products to one or more of the distribution platforms 116 to 120. An output memory 154 stores certain packaged digital media products prior to transmission, as will be explained in more detail below. The distribution module 132 may access the metadata memory 138, digital media memory 136 and product memory 140 for accessing product parts to form an output product.

The media provisioning module 148 controls the provisioning module 134 to build products not already present in the product memory 140. In particular, the provisioning module 134 has access to the digital media memory 136, from which it retrieves media files, and converts them to a format desired by the destination distribution platform. It may also add items of metadata to the media files, such as artist or track title retrieved from the metadata memory 138. The resulting generated product parts are stored in the product memory 140. Product parts for example correspond to music tracks, video files, images, metadata files and/or other elements that when combined form a digital media product.

For example, a music album product could comprise a number of music tracks, each having an ISRC (international sound recording code) reference, a cover image, booklet data including artists, lyrics etc., and one or more music videos.

A video product could comprise a feature length movie file or a number of episodes of a TV series, a screen capture image, a bonus video file, etc.

The generation and transmission of digital media products to one or more of the distribution platforms 116 to 120 is for example determined based on scheduling data from the scheduling file 209. An example of this data is shown in Table I below.

TABLE I

| UPC | Country | Streaming Release Date | Download Release Date | Distribution Platforms |
|---|---|---|---|---|
| 093211-339032 | France | Mar. 16, 2010 | NA | 116 |
| 023302-299853 | UK | Mar. 18, 2010 | Mar. 18, 2010 | 118 |
| 023302-299853 | US | Mar. 21, 2010 | Mar. 30, 2010 | 120 |
| 030868-429444 | France | NA | May 30, 2010 | 116 |
| 083220-013024 | Worldwide | Apr. 1, 2010 | Apr. 1, 2010 | ALL |
| ... | ... | ... | ... | ... |

Each row of this table corresponds to a distribution instruction to distribute a digital media product identified in this example by a 12-digital UPC (universal product code) in the first column to a given country of release indicated in the second column. Some products may be released in more than one country, such as the product in the second and third rows of the table, which is released in the UK and US, or the product in the fifth row, which is released worldwide. For each product and country, streaming and download release dates are provided in the third and fourth columns of the table, or for some products streaming or download may not be available, as represented by "NA" in the table. The fifth column in the table indicates the distribution platforms to be used for the release. In this example, the distribution platform 116 corresponds to a distribution platform for making products available in France, while platform 118 is for making products available in the United Kingdom, and platform 120 is for making products available in the United States. For example, platforms 116, 118 and 120 correspond to the hardware hosting the French, UK and US websites of iTunes respectively. Alternatively, distribution platforms may allow distribution of products to multiple countries. Obviously, there may be more than one distribution platform in each country, if for example a product is to be made available on multiple websites. The product in the fifth row of the table I is for example distributed to all distribution platforms, as indicated by the text "ALL" in the corresponding cell.

The table I may additionally include other information, such as pricing information for a particular country, the title in the language of the particular country, etc.

Operation of the platform 104 of FIG. 1B will now be described in more detail with reference to the flow diagram of FIG. 2.

In a first step S1, it is determined whether there is a new distribution instruction for a digital media product. In particular, when the asset management module 130 receives new media master files and/or metadata corresponding to a new product, one or more new distribution instructions are generated in the scheduling file 142, depending on the number of distribution platforms to which the product is to be transmitted.

If in step S1 there is no new distribution instruction, the next step is S2, in which there is for example a one-hour delay before step S1 is repeated. On the other hand, if in step S1 a new distribution instruction is identified, the next step is S3.

In step S3, the product data corresponding to the product is obtained. This data may be extracted from metadata provided for a given product, and indicates the product parts that are to form the digital media product. For example, in the case of a music album, it indicates the tracks forming the album, as well as any album art to be supplied with the album product. Furthermore, the product information may indicate what metadata is to be included with the product, such as pricing information, track or film titles, and information relevant to a particular release in a particular country of a media content.

In a next step S4, it is determined whether all of the parts of the product already exist in the product memory 140. This step involves a check by the media provisioning module 148 as to whether any or all of the product parts have been the subject of a previous order, and if so whether they are still stored in the product memory 140. In particular, as will be described in more detail below, if the product data for this product has already been generated, it may be retrieved directly from product memory 140 of FIG. 2, rather than repeating the processing steps needed to build it. This step could also involve checking that certain metadata for a product is available in the metadata memory 138.

If one or more product parts do not already exist in the product memory 140, the next step is S5, in which these product parts are added to a build list to be manufactured by the provisioning module 134 prior to the delivery date of the product. In particular, the media provisioning module 148 of the distribution module 132 is for example responsible for scheduling when processing resources are allocated to the manufacture of particular product parts, based on the delivery deadlines for each product part.

If all of the product parts do already exist in the product memory 140, or after adding any non-existing parts to the build list in S5, the next step is S6, in which it is determined whether the delivery date and time have been reached. In particular, this involves a comparison of the current date and time with the download or streaming release date minus an advance period "A". The advance period "A" corresponds to the number of days and hours in advance of the product release date that a digital media product should be delivered to a given distribution platform. This advance period "A" for example depends on the time needed for the distributor to prepare their platform for the distribution of the upcoming new release. A given distributor for example negotiates a given advance period for all the media products to be made available via their website.

If the delivery data and time have not been reached in step S6, the next step is S7, in which there is a delay of 6 hours before step S6 is repeated. In particular, the distribution system 104 described herein for example supports four product transmission periods of 6 hours within a 24-hour period.

When the delivery date and time are reached, the next step is S8, in which it is determined whether the product parts of the current product are to be loaded in advance into the output memory 154. This decision is based on the transmission type to be used for the distribution platform receiving the current product, each platform for example having one of a few different technical requirements for the receipt of media.

If the product parts are to be pre-loaded to the output memory 154, the next step after S8 is S9, in which the product parts forming the current digital media product are retrieved from the product memory 140, and packaged with corresponding metadata retrieved from the metadata memory 138, to generate a file ready for transmission to one or more distribution platforms 116 to 120. Then, in a next step S10, the packaged product is stored in the output memory 154 of the distribution module 132 pending transmission. Depending on the availability of the distribution platforms to download the new products, the packaged product may be stored in the output memory 154 for a matter of minutes, hours, and even days. Then, in the next step S11, the packaged product is transmitted to one or more distribution platforms.

In the case that, in step S8, it is determined that the product parts are not to be pre-loaded to the output memory 154, the next step is S12, in which the distribution platform is informed that there is a new product ready for collection. For example, the delivery module 152 hosts a website having a secure domain associated with each distribution platform. By entering their secure domain, for example by means of a user name and password, the operator of the distribution platform may view, via an access post with suitable user interface, any new products available for download, as well as a history of previous downloads, and information on products that will become available in the future. Then, the next step is S13, in which an operator of the distribution platform initiates the download of the digital media product, for example by selecting a link displayed in their domain of the website. This link is for example associated with information indicating the locations of the various product parts forming the product in the product memory 140, allowing the files to be transferred directly from product memory 140 to the distribution platform, without passing through the output memory 154.

After both steps S11 and S13, the next step is S14, in which it is determined whether the delivery is complete. In particular, it is verified that all of the product parts of the product have been successfully downloaded by the distribution platform.

If delivery has not been successfully completed, the next step is S15, in which it is determined whether an availability period for the product has expired. In particular, products are for example made available to a given distribution platform for a limited time period of for example 48 hours. If this period has not expired, the next step is S16, in which there is a delay, before returning to S14. Once the delivery of all product parts is complete, or if the availability period has expired, the next step is S17.

In S17, it is determined whether, for each product part, there are any pending distribution instructions in the scheduling file 142. In other words, it is determined whether it is anticipated to transmit again a same product part to a different distribution platform. For product parts that feature in pending distribution instructions, the next step is S18, in which these product parts are kept in the product memory 140. However, for product parts that do not feature in any pending distribution instructions, the next step is S19, in which these product parts are deleted from the product memory 140.

For example, if the product is a music album, the album may be released at different dates in different countries. In this case, the same product parts can be packaged with different metadata, based on which country the product is to be released in, and thus the same product parts may be re-used. Given that building the product parts generally requires high processing resources, keeping product parts in the product memory 140 enables avoiding a future repetition of these processing steps. On the other hand, if no future transmission of a product part is anticipated, the product part may be deleted, thereby economizing useful storage space in the product memory 140.

After steps S18 and S19, the method returns to step S1.

Figure 2:
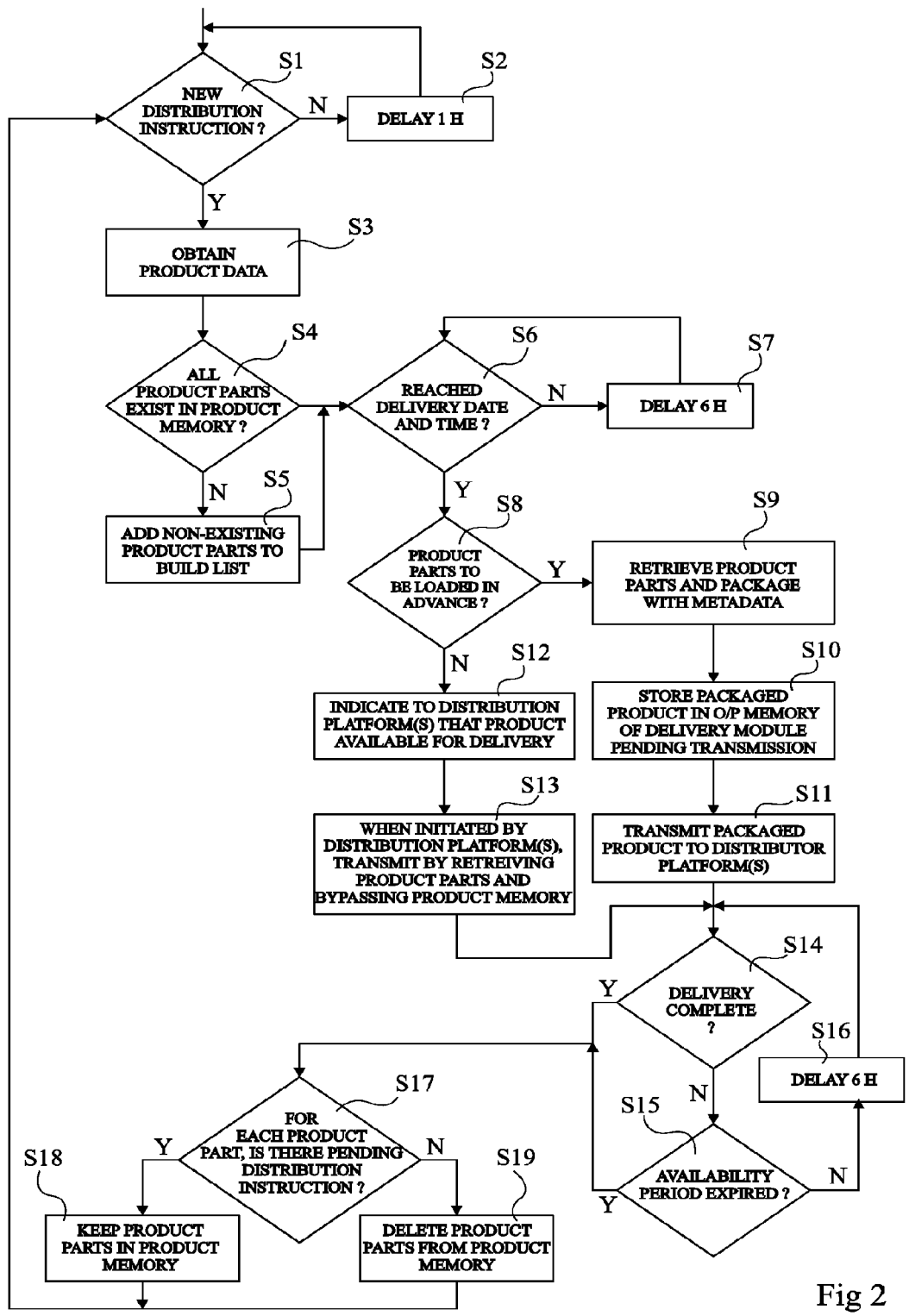
FIG. 2 is a flow diagram showing steps in a method for generating and transmitting digital media products according to an embodiment of the present invention.

It will be appreciated that the method illustrated by FIG. 2 can be performed in parallel for multiple distribution instructions, each concerning a given digital media product and a given distribution platform.

As an example of the selective deletion of product parts from the product memory 140, with reference again to Table I above, the product in the second and third rows is available slightly earlier in the UK than in the US. Assuming that both the distribution platforms 118 and 120 should receive products ten days before the release date, i.e. advance period A=10, the product should be transmitted to platform 118 on Mar. 8, 2010. Three days later, on Mar. 11, 2010, the product should be transmitted to platform 120. Thus, there is an interest in keeping the generated product in the product memory 140 at least until the product has been transmitted on Mar. 11, 2010.

In alternative embodiments, rather than only deleting a product if there are no future transmissions planned, it may also be deleted if no future transmissions are scheduled within a given period, in other words if the next transmission is greater than a threshold of T days. For example, assuming that product 023302-299853 of Table I is to be released in France on Apr. 15, 2010, with an advance period of 10 days, then the product is not to be transmitted until Apr. 5, 2010. Assuming a threshold T is chosen to be 14 days, the transmission for France will not occur within 14 days after the transmission in the US, and thus after transmitting the product to the US, it is deleted.

Furthermore, the decision of whether or not to delete a product part from the product memory 140 may be taken at other times that directly after the transmission of a product, and could be additionally based on other criteria, such as the size of the file, and how demanding it is to generate in terms of processing resources.

For example, in some embodiments, some product parts may be systematically deleted from the product memory 140 after transmission. This could apply to large files that are computationally easy to generate.

Alternatively or additionally, in some embodiments, some product parts may always be kept in the product memory 140, irrespective of whether or not there are pending distribution instructions. This could apply to small files that are computationally demanding to generate.

Figure 3:
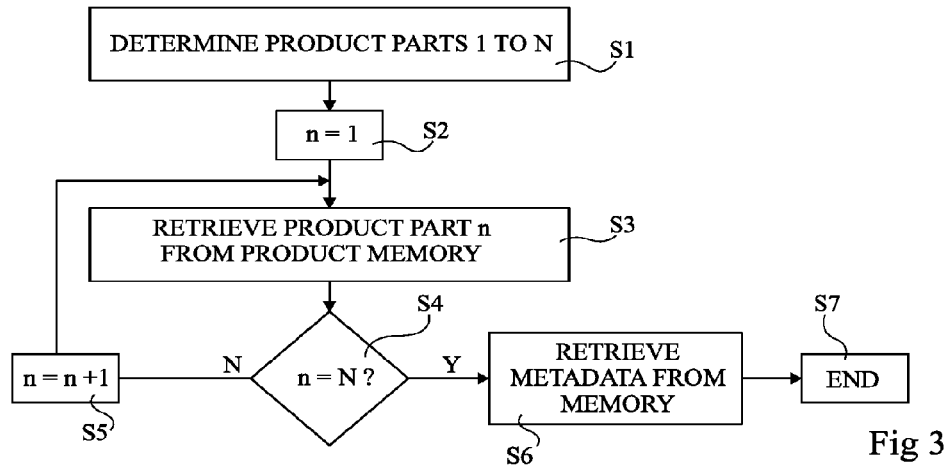
FIG. 3 is a flow diagram showing steps in a method for retrieving product parts of a digital media product according to embodiments of the present invention.

FIG. 3 is a flow diagram illustrating steps in a method for retrieving a product from the product memory 140, for example implementing step S9 or S13 of FIG. 2.

In a first step S1, the product parts 1 to N of the digital media product of a current distribution instruction are determined based on the product information. Digital media products for example comprise at least two digital media files, although in certain cases, the products may comprise just a single media file.

In a next step S2, a value "n" is initialized to 1.

In a next step S3, the electronic file corresponding to product part n is retrieved from the product memory 140. This file is either loaded into the output memory 154, or downloaded directly to a distribution platform, depending on the transmission type for the destination distribution platform.

In a next step S4, it is determined whether n is equal to N. If not, the next step is S5, in which n is incremented, and then steps S3 and S4 are repeated for the next product part. Once n is equal to N in step S4, the next step is S6, in which metadata corresponding to the product is retrieved from the metadata memory 138, to complete the digital media product. In alternative embodiments, the metadata may be retrieved before the product parts, or it may form one of the product parts 1 to N, loaded into the product memory. For example, some elements of metadata, such as artist names, song titles etc., may be treated in the same way as other product parts, and can thus be reused for more than one product. Other elements of the metadata, such as price information or usages, may be unique to a given distribution platform, and are thus retrieved for each product.

Figure 4:
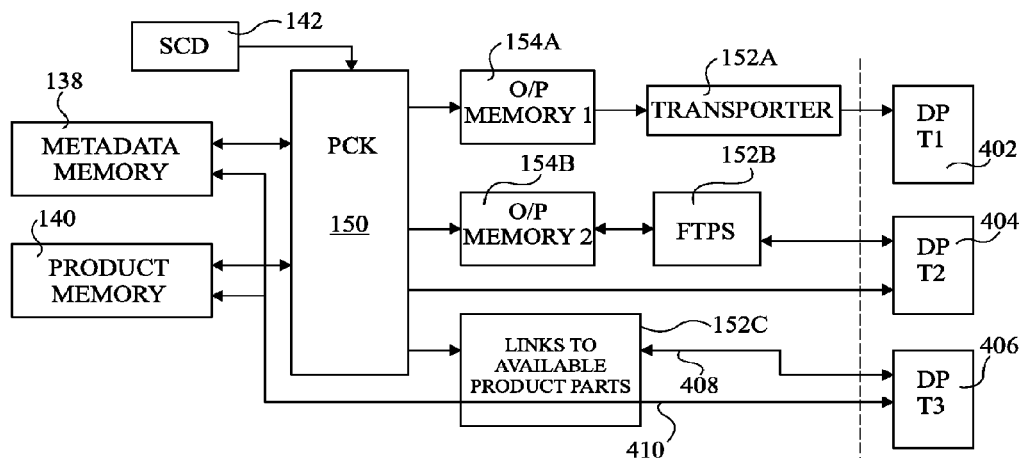
FIG. 4 illustrates elements of the distribution system of FIG. 1B in more detail according to embodiments of the present invention.

FIG. 4 illustrates certain elements of the distribution system 104 of FIG. 2 in more detail to illustrate an example of the types of product transmission that may be supported.

The packaging module 150 has access to the metadata memory 138 and product memory 140, and also to the scheduling data 142. Based on the scheduling data 142, the packaging module 150 determines the distribution platform or platforms to which a digital media product is to be transmitted. In this example, there are three types of transmission that may take place, a first type T1 to a group of one or more distribution platforms 402, a second type T2 to a group of distribution platforms 404, and a third type T3 to a group of distribution platforms 406.

For the transmission of a media product to a distribution platform of group 402, the product parts of the media product are pre-loaded to a portion 154A of the output memory 154. Once this has been completed, a transporter 152A forming part of the delivery module 152 provides a protocol for the transmission of the media product, for example grouped into a single folder, to a distribution platform of group 402.

For the transmission of a media product to a distribution platform of group 404, the products parts are pre-loaded to a portion 154B of the output memory 154. This pre-loading operation for example also generates a compressed folder such as a zip folder containing the files. A FTPS (file transfer protocol secure) server 152B forming part of the delivery module 152 then provides a secure file transfer protocol allowing the files from output memory 154B to be downloaded to a distribution platform of group 404.

For the transmission of a media product to a distribution platform of group 406, no pre-loading is performed, and instead, a sub-module 152C of the delivery module 152 provides links to available product parts that are stored in the product memory 140 and associated metadata from memory 138, when the product parts are available for download. As explained above, the links are for example provided on a website, within a domain associated with the receiving distribution platform. A connection 408, for example over the internet, allows an operator of the distribution platform to select product parts for download, which are then retrieved, via a connection 410, directly from the product memory 140. The connection 410 is for example an HTTP (hypertext transfer protocol), although other data transfer protocols could be used, such as protocols provided by Asperia or Signiant (the names "Asperia" and "Signiant" are likely to be registered trademarks). The files that are accessible by the distribution platform are controlled by the delivery sub-module 152C to ensure that a given distribution platform may not gain unauthorized access to product parts from the product memory 140 not intended for them.

Figure 5:
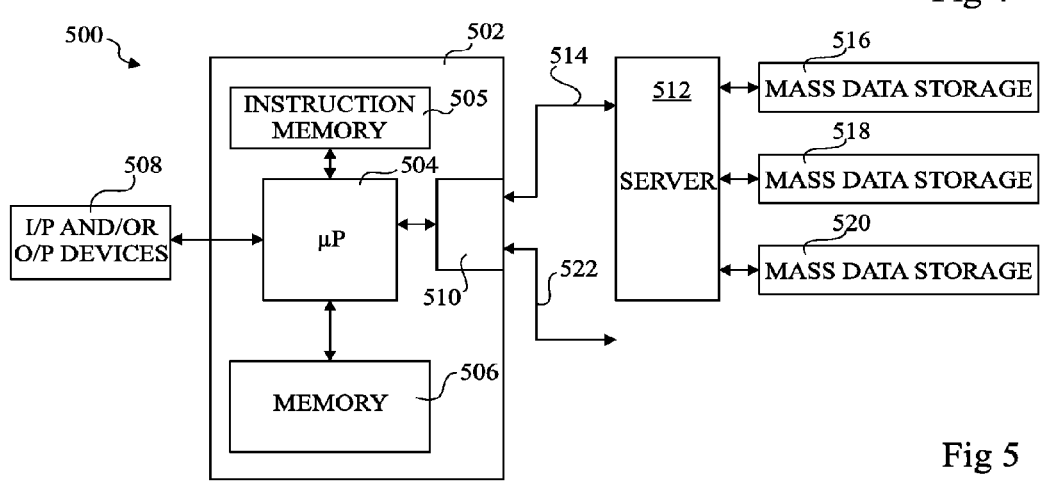
FIG. 5 schematically illustrates hardware components implementing the distribution system of FIG. 1B according to embodiments of the present invention.

FIG. 5 illustrates an example of hardware 500 implementing the system 104 of FIG. 1B. Hardware 500 comprises a computer 502 comprising a microprocessor 504 coupled to an instruction memory 505, for receiving instructions that implement the method steps of FIGS. 2 and 3 described above. A further memory 506 is also provided, comprising one or more memory devices such as flash memory, hard disk drives etc., which for example contain the output memory 154 of FIG. 1B, or output memory portions 154A and 154B of FIG. 4. The microprocessor 504 is also coupled to one or more input and output devices 508, which can include display monitors, input keyboards, etc. The microprocessor 504 is coupled to a network interface 510, providing access to a server 512 via a network connection 514.

The server 512 provides access to mass storage devices 512, 518 and 520, which for example store the digital media database 112 of FIGS. 1A and 1B. Each device 512, 518 and 520 for example stores between 1 and 50 terabytes of data. Furthermore, the network interface 510 allows communication via a connection path 522 to the Internet and/or other secured connections, for example to the distribution platforms 116 to 120 and media supply platforms 102.

An advantage of the embodiments described herein is that, by selectively deleting product parts of digital media products from the product memory, memory resources may be liberated, leading to a smaller memory requirement. Furthermore, for product files that are to be used again, maintaining such files in the product memory can reduce future processing requirements.

A further advantage is that, by selectively deleting products for which a future release occurs after a threshold of T days, the memory resources may also be freed earlier for other functions.

A further advantage of embodiments described herein is that, by selectively pre-loading product parts to the output memory or providing a transmission path directly to the product memory bypassing the output memory, the use of memory resources may be reduced for transmission to at least some distribution platforms.

Having thus described at least one illustrative embodiment of the invention, various alterations, modifications and improvements will readily occur to those skilled in the art.

For example, it will be apparent to those skilled in the art that the embodiments of the product generation and transmission system described herein may be implemented in hardware, software, or a combination thereof.

Furthermore, it will be apparent that various aspects of the system described herein are optional, such as the use of particular metadata in the packaged product and the conversion of the media files. It will also be apparent to those skilled in the art that the system 104 could receive media files from multiple media supply platforms.

Such alterations, modifications and improvements are intended to be within the spirit and scope of the invention. Accordingly, the foregoing description is by way of example only and is not intended to be limiting. The invention is limited only as defined in the following claims and the equivalent thereto.

The invention claimed is:

1. A method comprising:
   identifying, by a device, scheduling data associated with transmission of a media product to a user device using a distribution platform, the scheduling data including:
     delivery date information associated with the transmission of the media product,
       the delivery date information including a delivery date that varies based on a location of the user device, and
     time information associated with the transmission of the media product;
   determining, by the device, a transmission type associated with the distribution platform,
     the transmission type being a first transmission type or a second transmission type,
       the first transmission type being different than the second transmission type;
   determining, by the device and when the delivery date is reached, if information associated with the media product should be loaded into an output memory of the device,
     the information associated with the media product being loaded into the output memory of the device based on the transmission type; and
   transmitting, by the device and based on the delivery date information, the time information, and the transmission type, the media product to the distribution platform,
     the media product being retrieved from another memory, stored in the output memory, and provided, from the output memory and to the distribution platform, when the transmission type associated with the distribution platform is the first transmission type, and
     the media product being provided, to the distribution platform and without using the output memory, when the transmission type associated with the distribution platform is the second transmission type.

2. The method of claim 1, further comprising:
   transmitting, to the distribution platform, information indicating that the media product is available for download; and
   receiving, based on the transmitted information, a response from the distribution platform.

3. The method of claim 2, where
   the transmitted information is transmitted using a website, and
   the response is generated by selection of a link provided on the website.

4. The method of claim 1, further comprising:
   identifying a plurality of digital media files associated with the media product;
   generating product parts based on the plurality of digital media files; and
   storing the product parts in the other memory.

5. The method of claim 4, further comprising:
   automatically deleting the product parts after transmitting the media product.

6. The method of claim 4, further comprising:
determining that a time period associated with the media product has expired; and
deleting, based on the expiration of the time period, the product parts before transmitting the media product.

7. The method of claim 1, further comprising:
determining, based on the scheduling data and after transmitting the media product, if a pending distribution to another distribution platform exists; and
deleting, when the pending distribution does not exist, the information associated with the media product.

8. The method of claim 1, further comprising:
determining, based on the scheduling data and after transmitting the media product, if a pending distribution to another distribution platform exists; and
maintaining, when the pending distribution exists, the information associated with the media product for transmission to the other distribution platform.

9. A system comprising:
a network device, including a processor, to:
identify scheduling data associated with transmission of a media product to a user device using a distribution platform, the scheduling data including:
delivery date information associated with the transmission of the media product,
the delivery date information including a delivery date that varies based on a location of the user device, and
time information associated with the transmission of the media product;
determine a transmission type associated with the distribution platform,
the transmission type being a first transmission type or a second transmission type,
the first transmission type being different than the second transmission type;
determine, when the delivery date is reached, if information associated with the media product should be loaded into an output memory of the network device,
the information associated with the media product being loaded into the output memory of the network device based on the transmission type; and
transmit, based on the delivery date information, the time information, and the transmission type, the media product to the distribution platform,
the media product being retrieved from another memory, stored in the output memory, and provided, from the output memory and to the distribution platform, when the transmission type associated with the distribution platform is the first transmission type, and
the media product being provided, to the distribution platform and without using the output memory, when the transmission type associated with the distribution platform is the second transmission type.

10. The system of claim 9, where the network device is further to:
transmit, to the distribution platform and using a website, information indicating that the media product is available for download; and
receive, based on the transmitted information, a response from the distribution platform, the response being generated by selection of a link provided on the website.

11. The system of claim 9, where the network device is further to:
identify a plurality of digital media files associated with the media product;
generate product parts based on the plurality of digital media files; and
store the product parts in the other memory.

12. The system of claim 11, where the network device is further to:
automatically delete the product parts after transmitting the media product.

13. The system of claim 11, where the network device is further to:
determine that a time period associated with the media product has expired; and
delete, based on the expiration of the time period, the product parts before transmitting the media product.

14. The system of claim 9, where the network device is further to:
determine, based on the scheduling data and after transmitting the media product, if a pending distribution to another distribution platform exists; and
delete, when the pending distribution does not exist, the information associated with the media product.

15. The system of claim 9, where the network device is further to:
determine, based on the scheduling data and after transmitting the media product, if a pending distribution to another distribution platform exists; and
maintain, when the pending distribution exists, the information associated with the media product for transmission to the other distribution platform.

16. A non-transitory computer readable medium storing instructions, the instructions comprising:
one or more instructions which, when executed by at least one processor of a device, cause the at least one processor to:
identify scheduling data associated with transmission of a media product to a user device using a distribution platform, the scheduling data including:
delivery date information associated with the transmission of the media product,
the delivery date information including a delivery date that varies based on a location of the user device, and
time information associated with the transmission of the media product;
determine a transmission type associated with the distribution platform,
the transmission type being a first transmission type or a second transmission type,
the first transmission type being different than the second transmission type;
determine, when the delivery date is reached, if information associated with the media product should be loaded into an output memory of the device,
the information associated with the media product being loaded into the output memory of the device based on the transmission type; and
transmit, based on the delivery date information, the time information, and the transmission type, the media product to the distribution platform,
the media product being retrieved from another memory, stored in the output memory, and provided, from the output memory and to the distribution platform, when the transmission type associated with the distribution platform is the first transmission type, and the media product being provided, to the distribution platform and without using the output memory, when the transmission type associated with the distribution platform is the second transmission type.

17. The non-transitory computer readable medium of claim 16, where the instructions further comprise:
one or more instructions to transmit, to the distribution platform and using a website, information indicating that the media product is available for download; and
one or more instructions to receive, based on the transmitted information, a response from the distribution platform,
the response being generated by selection of a link provided on the website.

18. The non-transitory computer readable medium of claim 16, where the instructions further comprise:
one or more instructions to determine that a time period associated with the media product has expired; and
one or more instructions to delete, based on the expiration of the time period, product parts, associated with the media product, before transmitting the media product.

19. The non-transitory computer readable medium of claim 16, where the instructions further comprise:
one or more instructions to determine, based on the scheduling data and after transmitting the media product, if a pending distribution to another distribution platform exists; and
one or more instructions to delete, when the pending distribution does not exist, the information associated with the media product.

20. The non-transitory computer readable medium of claim 16, where the instructions further comprise:
one or more instructions to determine, based on the scheduling data and after transmitting the media product, if a pending distribution to another distribution platform exists; and
one or more instructions to maintain, when the pending distribution exists, the information associated with the media product for transmission to the other distribution platform.

* * * * *